United States Patent
Narasimhan et al.

(10) Patent No.: US 10,013,715 B2
(45) Date of Patent: Jul. 3, 2018

(54) TEMPORARY WAIVER TOOL

(71) Applicant: BANK OF AMERICA CORPORATION, Charlotte, NC (US)

(72) Inventors: Raghavendran Narasimhan, Hyderabad (IN); Gurdeep Singh Walia, Hyderabad (IN); Anand Daga, Hyderabad (IN); Saroj Kumar Bonthapalli, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 930 days.

(21) Appl. No.: 14/336,526

(22) Filed: Jul. 21, 2014

(65) Prior Publication Data

US 2016/0019638 A1 Jan. 21, 2016

(51) Int. Cl.
 *G06Q 40/02* (2012.01)
(52) U.S. Cl.
 CPC .................................. *G06Q 40/02* (2013.01)
(58) Field of Classification Search
 CPC ........ G06Q 10/00; G06Q 20/00; G06Q 30/00; G06Q 40/00
 USPC ...................................................... 705/3–44
 See application file for complete search history.

(56) References Cited

U.S. PATENT DOCUMENTS

| | | | |
|---|---|---|---|
| 4,885,685 A | 12/1989 | Wolfberg et al. | |
| 5,121,945 A * | 6/1992 | Thomson | B42D 15/0053 283/58 |
| 5,774,879 A | 6/1998 | Custy et al. | |
| 6,064,986 A | 5/2000 | Edelman | |
| 6,108,641 A * | 8/2000 | Kenna | G06Q 20/04 705/2 |
| 6,324,523 B1 | 11/2001 | Killeen, Jr. et al. | |
| 7,233,929 B1 | 6/2007 | Lingle et al. | |
| 7,251,623 B1 | 7/2007 | Ryan et al. | |
| 7,401,025 B1 * | 7/2008 | Lokitz | G06Q 30/0281 705/346 |
| 7,457,776 B1 | 11/2008 | Caruso et al. | |
| 7,685,013 B2 | 3/2010 | Gendler | |
| 7,720,733 B2 | 5/2010 | Jung et al. | |
| 8,352,342 B1 | 1/2013 | Bent, II et al. | |
| 8,473,395 B1 * | 6/2013 | DeLoach | G06Q 20/24 705/35 |
| 8,498,938 B1 * | 7/2013 | Bierschwale | G06Q 40/02 705/1.1 |
| 9,460,471 B2 * | 10/2016 | Bernard | G06Q 40/08 |
| 2002/0165808 A1 | 11/2002 | Zamsky et al. | |

(Continued)

*Primary Examiner* — Frantzy Poinvil
(74) *Attorney, Agent, or Firm* — Michael A. Springs; Moore & Van Allen PLLC; Peter B. Stewart (57) ABSTRACT

Embodiments of the invention are directed to systems, methods and computer program products for use in financial systems, where data communication is automated for purposes of providing temporary waivers. An exemplary apparatus is configured to receive a request from a requesting entity to assign an account a temporary waiver. The account may be associated with one or more services that require a payment for utilizing the service. The system may then send the request to a processing entity to analyzes the request for approval, and receive an approval decision based at least partially on the analysis of the request. In response to receiving the approval decision, the system may process at least one subsequent action for providing or declining a temporary waiver.

20 Claims, 6 Drawing Sheets

(56) References Cited

U.S. PATENT DOCUMENTS

| | | |
|---|---|---|
| 2002/0169715 A1 | 11/2002 | Ruth et al. |
| 2003/0050884 A1 | 3/2003 | Barnett |
| 2003/0083975 A1* | 5/2003 | O'Grady ............... G06Q 40/02 705/37 |
| 2004/0073511 A1 | 4/2004 | Beaumont et al. |
| 2005/0209938 A1 | 9/2005 | Czyzewski et al. |
| 2006/0031161 A1* | 2/2006 | D'Agostino ........... G06Q 20/02 705/44 |
| 2006/0059073 A1 | 3/2006 | Walzak |
| 2006/0173706 A1 | 8/2006 | Allin et al. |
| 2007/0106526 A1 | 5/2007 | Jung et al. |
| 2007/0162308 A1* | 7/2007 | Peters ................... G06F 19/322 705/2 |
| 2007/0203817 A1 | 8/2007 | Jung et al. |
| 2008/0027861 A1 | 1/2008 | Gendler |
| 2008/0133392 A1 | 6/2008 | Jung et al. |
| 2008/0177558 A1 | 7/2008 | Jung et al. |
| 2009/0043683 A1 | 2/2009 | Jung et al. |
| 2009/0048957 A1 | 2/2009 | Celano |
| 2010/0241501 A1 | 9/2010 | Marshall |
| 2011/0125636 A1* | 5/2011 | Allin .................. G06Q 10/0875 705/40 |
| 2012/0041838 A1* | 2/2012 | Serbanescu ........ G06Q 30/0601 705/26.4 |
| 2014/0136449 A1* | 5/2014 | Bartmann .............. G06Q 90/00 705/500 |
| 2014/0164475 A1* | 6/2014 | Gargiulo .................. H04L 9/32 709/202 |
| 2014/0226534 A1* | 8/2014 | Felger ................... H04M 15/68 370/259 |

* cited by examiner

| Processor Name 301 | SR # 302 | Account # 303 | Start Month (MM/DD/YY) 304 | End Month (MM/DD/YY) 302 | Requestor Name 306 | Addressed ? **To be filled after expiration 307 | Associate Email ID 308 | FLM Email ID 308 |
|---|---|---|---|---|---|---|---|---|
| Processor A | 1-1111 | 22222 | 05/01/13 | 07/31/13 | Requestor A | | Username@Domain | Username@Domain |
| Processor A | 1-1112 | 22223 | 05/01/13 | 6/30/13 | Requestor A | | Username@Domain | Username@Domain |
| | | | | | | | | |

*FIGURE 3*

| Processor Name 301 | SR # 302 | Account # 303 | Start Month (MM/DD/YY) 304 | Associate Email ID 308 | End Month (MM/DD/YY) 302 | Start Month (MM/DD/YY) 304 | Requestor Name 306 | Expired 309 | Addressed ? **To be filled after expiration 307 | DG Email ID 308 |
|---|---|---|---|---|---|---|---|---|---|---|
| Processor A | 1-1111 | 22222 | 05/01/13 | Username@Domain | 07/31/13 | 05/01/13 | Requestor A | 0 | | Username@Domain |
| Processor A | 1-1112 | 22223 | 05/01/13 | Username@Domain | 07/31/13 | 05/01/13 | Requestor A | 1 | | Username@Domain |
| | | | | | | | | | | |

*FIGURE 4*

| Processor Name 301 | SR # 302 | Account # 303 | Start Month (MM/DD/YY) 304 | End Month (MM/DD/YY) 302 | Requestor Name 306 | Addressed ? **To be filled after expiration 307 | Associate Email ID 308 | FLM Email ID 308 |
|---|---|---|---|---|---|---|---|---|
| Processor A | 1-1111 | 22222 | 05/01/13 | 07/31/13 | Requestor A | | Username@Domain | Username@Domain |
| Processor A | 1-1112 | 22223 | 05/01/13 | 6/30/13 | Requestor A | Yes | Username@Domain | Username@Domain |
| | | | | | | | | |

TEMPORARY WAIVER TOOL

BACKGROUND

Traditionally, when identifying waiver request it is necessary to contact specific business personnel such as Portfolio Management Team through email as designed per the business procedures. The contacted personnel may then be responsible for either approving or denying the request for the waiver. On approval, the business system may be instructed to place the related account on waiver or alternatively prompted to contact the requesting entity such as the Client Manager in instances where a request has been rejected and the system has taken no action aside from informing the requesting entity of the request denial.

Several challenges exist within the current waiver process. In one aspect, once an account is placed on waiver, it can only be placed back into a payment status in response to the requesting entity sending an additional request for the account to be place back into a payment status. As such, it is a necessity to rely on the requestor to send a second request to place the account back into payment status when the duration of the waiver is over. Current systems and applications do not process the feasibility to automatically change the status of an account from waiver to payment when the duration of the temporary waiver has expired.

Therefore, a need exist for a means to seamlessly track accounts that have been placed on a temporary waiver and automate follow-up procedures with the requesting entities when the duration of the waivers have expired.

BRIEF SUMMARY

Embodiments of the invention are directed to systems, methods, and computer program products for use in financial systems, where data communication is automated for the purpose of providing temporary waivers. An exemplary apparatus for automating data communication for purposes of providing temporary waivers in a financial institution may comprise a memory, a computing processor, and a module stored in the memory. The module may comprise instruction code executable by one or more computing processors, and configured to cause the one or more computing processors to receive a request from a requesting entity to assign an account a temporary waiver, where the account is associated with one or more services that require a payment for utilizing the service, and where the temporary waiver temporarily cancels service payments associated with utilizing the one or more services. The request may then be sent to a processing entity, where the processing entity analyzes the request for approval. An approval decision is subsequently received based at least partially on the analysis of the request, and at least one action is processed in response to receiving the approval decision that indicates whether or not the request was approved or denied.

In some embodiments where the request comprises one or more items of required information, the module is further configured to cause one or more computing processors to review the request to verify that the one or more items of required information have been provided, temporarily reject the request in response to determining at least one item of required information has not been provided, and prompt the requesting entity to provide the at least one items of required information prior to resubmitting the request to assign the account a temporary waiver.

In some embodiments, where the request comprises one or more item of required information, the module is further configured to cause one or more computing processors to review the request to verify that the one or more items of required information are valid, temporarily reject the request in response to determining at least one item of required information is not valid, and prompt the requesting entity to provide valid information for the at least one item of required information prior to resubmitting the request to assign the account a temporary waiver.

In some embodiments, receiving a request from a requesting entity to assign an account a temporary waiver further comprises the module being further configured to cause one or more computing processors to log the waiver request in one or more databases associated with waiver request.

In some embodiments, the account is associated with a customer, and analyzing the request for approval further comprises the module being further configured to cause or more computing processors to access the customer's financial history, and determine the customer is eligible to receive a temporary waiver based at least partially on an analysis of the customer's financial history.

In some embodiments, the waiver request is time-sensitive, and the module is further configured to cause one or more computer processors to provisionally reject the request in response to receiving the approval decision after a predetermined period of time has elapsed.

In some embodiments, the module is further configured to cause one or more computer processors to determine one or more terms and conditions for usage of the temporary waiver in response to receiving an approval decision indicates the temporary waiver request is approved, send the terms and condition to a customer associated with the account, receive, from the customer, consent to agree to the one or more terms and conditions, and assign the account a temporary waiver in response to receiving the consent to agree to the one or more terms and conditions.

In some embodiments, the approval decision indicates the temporary waiver request is approved, and the at least one action comprises assigning the account temporary a waiver, and sending a confirmation message to the requesting entity to inform the requesting entity that the temporary request was approved.

In some embodiments, the approval decision indicates the temporary waiver request is approved, and the module is further configured to cause one or more computer processors to create at least one database record comprising related to the approved waiver request, and automatically update one or more databases with the record, where the one or more databases are associated with waiver request.

In some embodiments, the approval decision indicates the temporary waiver request is denied, and the at least one action comprises sending a confirmation message to the requesting entity to inform the requesting entity that the temporary request was denied.

In some embodiments, the approval decision indicates the temporary waiver request is approved, and the module is further configured to cause one or more computer processors to send one or more automated message to at least one entity associated with the waiver request. In such an embodiments, at least one automated message comprises a one-time message informing one or more entities of an upcoming expiration date for the temporary waiver, and at least one automated message comprises a daily message informing one or more entities of that an expiration date associated with the temporary waiver has passed and the temporary waiver duration is over.

In some embodiments, the approval decision indicates the temporary waiver request is approved, the approved temporary waiver has expired, and the module is further configured to cause one or more computing processors to request a follow-up response from the requesting entity to indicate whether or not the account should be placed into a payment status. In such an embodiment, where the follow-up response indicates the account should be placed back into payment status, and the module is further configured to cause one or more computing processors to terminate any automatically generated messages being communicated to one or more entities associated with the waiver request. In such an embodiments, where the follow-up response indicates the account should not be placed back into payment status, and the module is further configured to cause one or more computing processors to confirm a new expiration date to be associated with an extended temporary waiver.

An exemplary method for use in financial systems, whereby the method provides steps for automating data communication for purposes of providing temporary waivers, may comprise one or more steps, including receiving a request from a requesting entity to assign an account a temporary waiver, wherein the account is associated with one or more services that require a payment for utilizing the service, and wherein the temporary waiver temporarily cancels service payments associated with utilizing the one or more services; sending the request to a processing entity, wherein the processing entity analyzes the request for approval; receiving an approval decision based at least partially on the analysis of the request; and processing at least one action in response to receiving the approval decision that indicates whether or not the request was approved or denied.

In some embodiments, the waiver request is time-sensitive, and the method further comprises provisionally rejecting the request in response to receiving the approval decision after a predetermined period of time has elapsed.

An exemplary computer program product for use in financial systems, whereby the computer program product automates data communication for purposes of providing temporary waivers, may comprise a non-transitory computer-readable medium comprising a set of codes for causing a computer to receive a request from a requesting entity to assign an account a temporary waiver, wherein the account is associated with one or more services that require a payment for utilizing the service, and wherein the temporary waiver temporarily cancels service payments associated with utilizing the one or more services; send the request to a processing entity, wherein the processing entity analyzes the request for approval; receive an approval decision based at least partially on the analysis of the request; and process at least one action in response to receiving the approval decision that indicates whether or not the request was approved or denied.

In some embodiments, where the waiver request is time-sensitive, and the computer program product further comprises a set of codes for causing a computer to provisionally reject the request in response to receiving the approval decision after a predetermined period of time has elapsed.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for use in financial systems, where data communication is automated for the purpose of providing temporary waivers. The invention enables a system to receive a request to assign an account a temporary waiver and process at least one action in response to receiving the approval decision that is an approval decision based at least partially on the analysis of the request. As used herein, a "waiver" or "waiver status" may refer to the cancellation or deferral of service payments associated with utilizing a particular account service. Alternatively, a "payment status" may refer to the activation or reinstatement of service payments associated with utilizing a particular account service.

In some embodiments, an "entity" may refer to a business entity that is either requesting or approving a request to receive an account waiver. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies, and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself.

In some embodiments, the "client" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded). As used herein, the terms "client" and "customer" may be used interchangeably throughout the specification.

Figure 1:
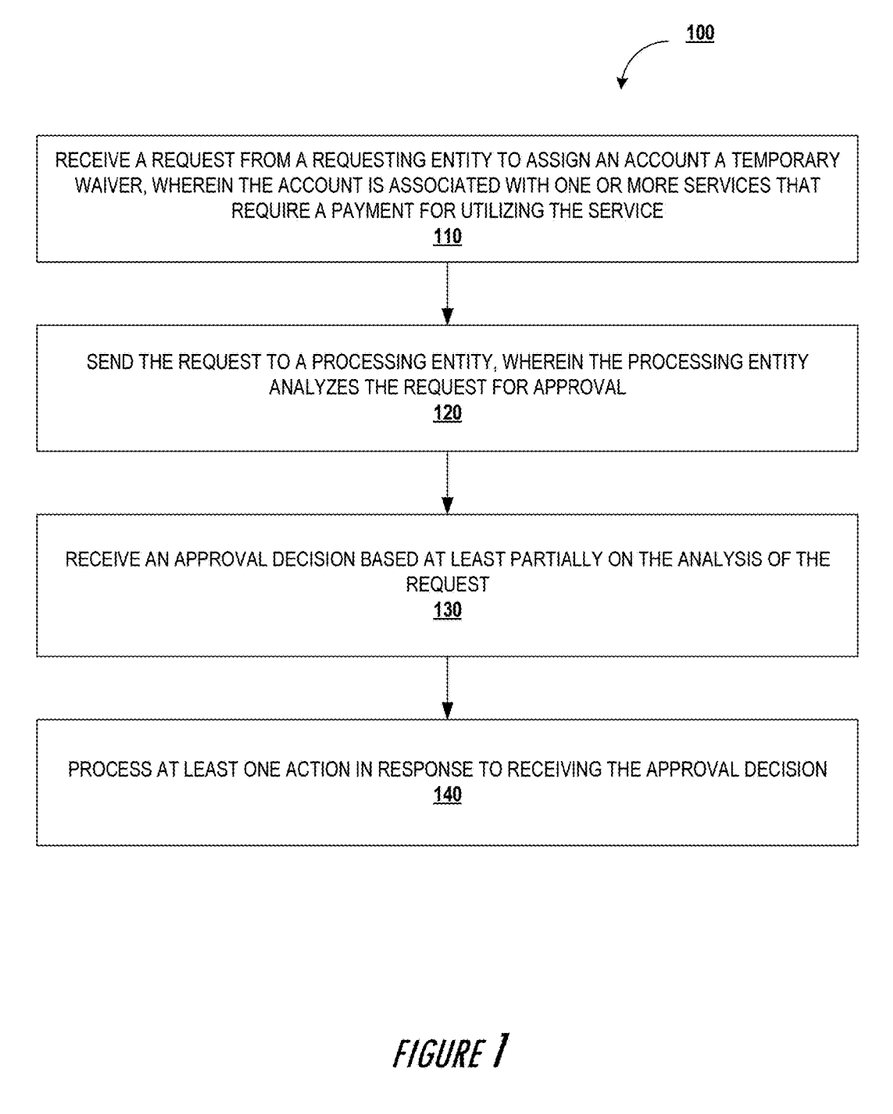
FIG. 1 is a high level process flow for a temporary waiver tool, in accordance with embodiments of the present invention.

Referring now to FIG. 1, a high level process flow for providing a temporary waiver tool 100 is illustrated in accordance with one embodiment of the present invention, which will be discussed in further detail throughout this specification. As illustrated, the method may comprise a plurality of steps, including but not limited to, receiving a request from a requesting entity to assign an account a temporary waiver 110, sending the request to a processing entity to analyze the request for approval 120, receiving an approval decision based at least partially on the analysis of the request 130, and processing at least one action in response to receiving the approval decision 140.

As used herein, a "permanent waiver request" or a "permanent waiver" may refer to any request or subsequent waiver which is received by a business entity and associated with an effective date for associating the account with a waiver but does not have an expiration date which ends the month or duration of the waiver. To this extent, accounts may remain in a permanent waiver status, without any additional action being required by the system, until the requesting entity sends a second request to place the account back into a payment status. For example, a permanent waiver request may state "Please place account XXXXX on waiver effective MM/YY (or effective Month/Year) until further notice".

As used herein, a "temporary waiver request" or a "temporary waiver" may refer to any request or subsequent waiver which is received by a business entity and associated with an effective date for associating the account with a waiver and also associated with an expiration date which ends the month or duration of the waiver. To this extent, accounts are scheduled to be reversed back into a payment status once the duration of the temporary waiver has expired. For example, a permanent waiver request may state "Please place account XXXXX on waiver effective MM1/YY1 (Month 1/Year 1) for 5 months. Hence the account should go back in payment status from MM2/YY2".

At step 110, the system may first receive a request from a requesting entity to assign an account a temporary waiver. To this extent, the account may be further associated with one or more services that require a payment for utilizing the service. The services may include any service that is provided by the business entity responsible for maintaining the related account. For example, the services may include, but not be limited to, management services, wire services, lock box services and the like. Likewise, the service payments may include, but not be limited to wire service payments, Automated Clearing House (ACH) service payments, and the like. As certain business entities, such as financial institutions, are known to provide an endless amount of services to their customers, in some instances the services associated with an account may depend on specific customer criteria or account types. Whereas eligibility for an account waiver may be based on eligibility criterion such as how many units a customer utilizes with the financial institution or business entity.

In an exemplary embodiment, a customer may be assessed a payment that is directly debited on the $15^{th}$ day of each month from a related deposit account. The system may then be configured to receive a request to waiver the previously assessed payment for utilizing the service. In some instances, by assigning accounts temporary waivers as a courtesy gesture, business entities may be viewed favorably by their customers and clientele such that the customer may subsequently choose to deepen their relationship with the business entity in the future and bring in additional business, for example. In some embodiments, the waiver may be implemented by deferring the assessment of payments associated with service usage. However, in other embodiments, the waiver may be implemented by applying payment credits and/or refunds to the account that negate the amount of any previously assessed service payments.

In some embodiments, the waiver request may be received directly from the client or customer associated with the account, a third party independent of the business entity acting on behalf of the customer, or the like. However, in exemplary embodiments, and as contemplated herein, waiver request are received from personnel within the business entity that are responsible for supplying request (e.g. waiver request) or acting on behalf of the customer in other function such as client managers.

In some embodiments, receiving a request to assign an account a temporary waiver may further comprise verifying the received request for accuracy and completion. Waiver request may include several items of information, including but not limited to, the name of the processing entity, the request number, the account number, a start date for the waiver, an end date for the waiver, the name of the requesting entity, and contact information of the involved parties. In some embodiments, the system may be configured to automatically provide and/or assign certain items of information within the waiver request such as the associated waiver request number, where certain items of information may be missing within the request. The system may additionally have pre-defined criteria for information that must be explicitly provided by the requesting entity such as the start date to be associated with the waiver upon approval and the end date to be associated with the waiver upon approval. As such, the system may be further configured to review the received request to verify that each item of required information has been provided. In an instance where one or more items of required information are determined to be missing from the waiver request, the system may then be configured to initially and/or temporarily reject or halt the waiver request and further prompt the requesting entity provide the missing items of information prior to forwarding and/or sending the request to the processing entity for approval. The system may be further configured to review the received request to verify that each item of required information is accurate. For example, the system may verify that the inputted account number is a valid account associated with the business entity, and/or that the requesting entity is verified personnel within the business that possess the authority to submit waiver request. In an instance where one or more items of required information are determined to be invalid, the system may then be configured to initially and/or temporarily reject or halt the waiver request and further prompt the requesting entity provide valid information prior to forwarding and/or sending the request to the processing entity for approval.

Figure 3:
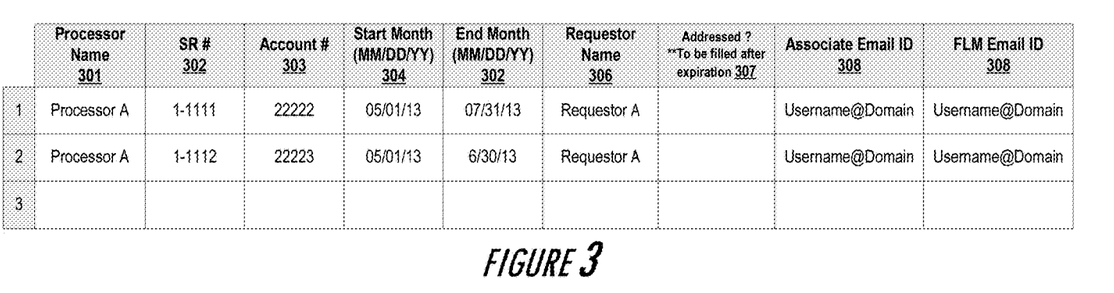
FIG. 3 is a screenshot illustrating a temporary waiver tool record log, in accordance with embodiments of the present invention.
Figure 4:
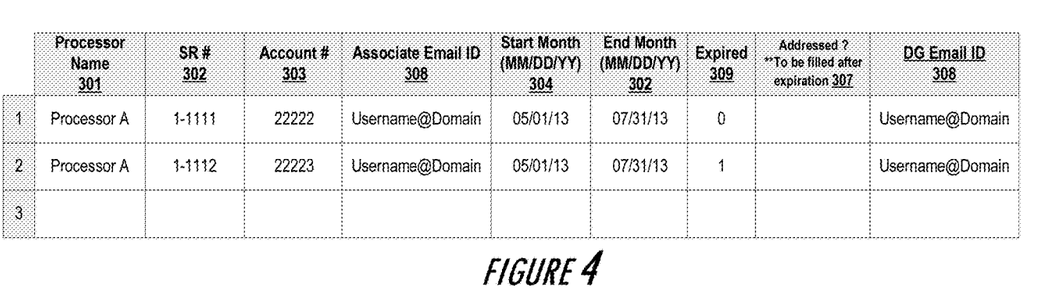
FIG. 4 is a screenshot illustrating a temporary waiver tool record log, in accordance with embodiments of the present invention.
Figure 5:
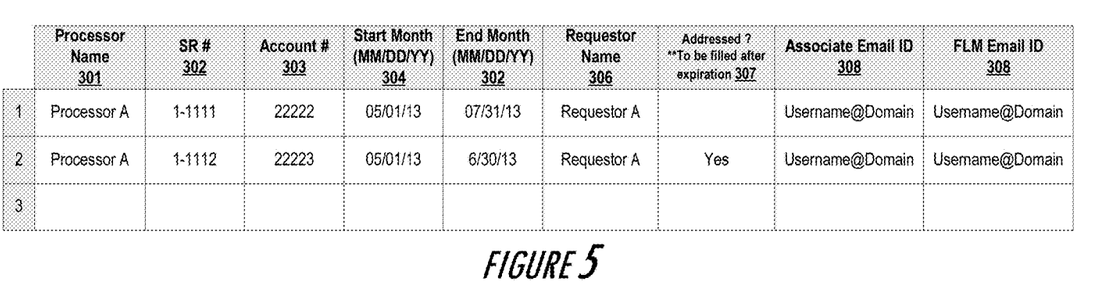
FIG. 5 is a screenshot illustrating a temporary waiver tool record log, in accordance with embodiments of the present invention.

In some embodiments, receiving a request to assign an account a temporary waiver may further comprise logging the waiver request in one or more associated databases. As shown in FIG. 3 through FIG. 5, the waiver request database may include several items of information, including but not limited to, the name of the processing entity 301, the request number 302, the account number 303, a start date for the waiver 304, an end date for the waiver 305, follow-up/expiration status (307,309), the name of the requesting entity 306, and contact information of the involved parties 308. The request log may be manually updated by personnel associated with the business entity or automatically updated by the system in response to receiving the request. In one embodiment, all received request are logged within the database. In other embodiments, only request that receive subsequent approvals are logged within the database.

At step 120, after receiving the request to assign an account a temporary waiver, the system may then send the request to a processing entity, where the processing entity is an entity responsible for reviewing, analyzing, and approving the received waiver request. In some embodiments, the waiver request may be sent to a third party independent of the business entity and acting on behalf of the business for the purpose of reviewing and providing an approval decision for the waiver request, or the like. However, in exemplary embodiments, and as contemplated herein, waiver request are sent to personnel within the business entity that are responsible for reviewing request (e.g. waiver request) or acting on behalf of the business entity in other function such as pricing managers and portfolio managers. For example, within a financial institution, if a client manager approaches a process to provide a waiver request for a period of three (3) months for a particular client, the waiver request may be routed to a processing entity for subsequent approval, where the processing entity is a liquidated portfolio pricing manager. As such the decision or the discretion for approval may lie with business personnel such as the pricing manager, the portfolio pricing manager, who may exclusively decide to provide the waiver request or to reject the waiver request.

In some embodiments, sending the request to the processing entity for approval may further comprise the system being configured to automatically analyze the received request. In an alternate embodiment, the processing entity may be embodied by the system itself or a software module or application owned and/or operated by the business entity and configured to review request (e.g. waiver request) and act on behalf of the business entity for the purpose of providing approval decisions in response to received waiver request as opposed to an individual within the business. As such, the decision or the discretion for approval may lie with business software or application which may be configured to exclusively decide to approve the waiver request or to reject the waiver request such that the system may be configured to automatically review the received request and provide an approval decision. To this extent the system may be configured to automatically execute one or more steps that electronically mimic the approval process that may be typically carried out manually by an individual within the business entity. For example, when providing and/or assigning an account a waiver, an associated client manager or other processing entity may be required to get in touch with the customer of the business according to various company policies. If it is determined that the customer meets the required standards or is in good standing with the company policies, then the processing entity may approve the waiver for a certain period of time. As such, the system may be configured to automatically contact the customer (or access the customer's account information by other means) to receive and/or obtain information that verifies that the customer meets the required standards or is in good standing with the company policies. For example, in a financial institution, the system may access/retrieve and analyze the customers financial history, including transaction history, financial standings, account type(s), account balance(s), and the like to determine one or more trends that exist within the customer account and/or other information useful for providing approval decisions in response to waiver request. In another example, the system may automatically generate messages (e.g. email messages, multimedia message, text messages, social networking messages, internal messages within online banking or other business entity platforms, and the like) that may be sent to the customer for the purpose of requesting the customer provide necessary information required to completely and accurately analyze the request to provide an account waiver.

In some embodiments, automatically analyzing the received request may further comprise comparing the waiver request, related account information, and/or retrieved customer information to predetermined approval criterion. The approval criterion may be predefined by the business entity, general business industry standards, an associated third party, or the like. In one embodiment, the request may be automatically denied in response to determining the customer does not meet the predetermine approval criterion. In another threshold, the customer may be required to satisfy a minimal number of approval criteria in order to receive an approval decision. For example, if the business standard defines ten (10) parameters for approval, a customer may be only required to satisfy at least six of the parameters in order to receive subsequent approval for a waiver request.

At step 130, after sending the request to a processing entity for approval, the system may then receive an approval decision based at least partially on the analysis of the request by the processing entity. In some embodiments, an automated received approval request may be sent to an individual within the business, such as a portfolio manager, to verify it's accuracy, where the business personnel may further reverse the approval decision such that the system is configured to reverse an automated approval decision in response to receiving a request from business personnel to reverse the automated approval decision. One or more actions may be processed in response to receiving an approved waiver request decision, including but not limited to, assigning an account a waiver status, sending confirmation of the approved waiver request to the requesting entity, updating one or more associated waiver databases, and the like. One or more actions may be processed in response to receiving a denied waiver request decision, including but not limited to, sending confirmation of the denied waiver request to the requesting entity, taking no additional actions with the account, and the like.

In some embodiments, waiver request may be time sensitive such that if an approval decision is not received in a timely fashion the system may be configured to provisionally reject the request regardless of the received approval decision. This feature may be utilized to ensure that accurate and up-to-date information is used in approving the waiver request. In an instance where the waiver approval decision is not received in a timely fashion the system may be configured to resend the waiver request for review and approval prior to accepting the approval decision. For example, if a waiver request is submitted in January and comprises information relative to the customer's account status during the month of January, and an approved wavier decision is not received until March where the customer's account status has changed within the lapse of time, the system may then resend the waiver request such that it is subsequently reviewed and either approved or denied based on the status of the customer's account during the month of March. To this extent, the system may resend any request for which the approval decision is not received within a predetermined period of time.

In some embodiments, receiving an approval decision, where the approval decision states that the waiver request has been approved, may further comprise receiving and/or determining one or more conditions for approval and usage of the waiver request. For example, the conditions of approval may state that customer must remain within their current account standings during the duration of the temporary waiver in order for the waiver to remain valid. As such in a instance where the system determines that a previously approved account is no longer in good standing the waiver may be revoked before the duration of the temporary waiver has expired. To this extent, the system may be further configured to send the term and conditions of approval to the customer, and subsequently receive consent, from the customer, of the terms and conditions prior to taking additional actions such as assigning the temporary waiver to the related account. In an instance where it is determined that the customer has failed to consent to the terms and conditions of the temporary waiver approval, the system may proceed to take no action on the customer account regardless or receiving an approved waiver request decision.

Figure 2:
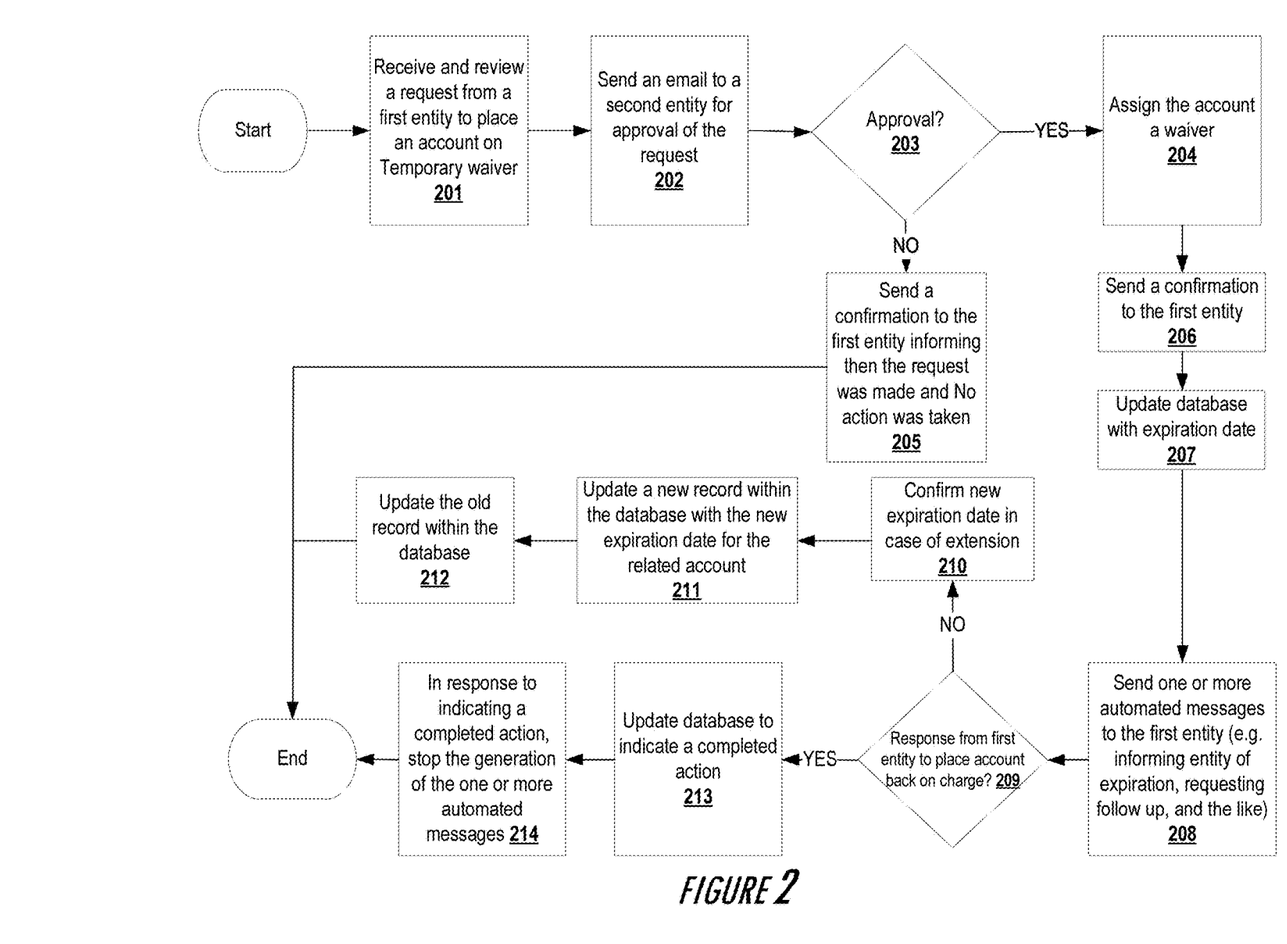
FIG. 2 is a flowchart illustrating a general process flow for a temporary waiver tool, in accordance with embodiments of the present invention.

At step 140, after receiving an approval decision based at least partially on the analysis of the request by the processing entity, the system may then process one or more actions in response to receiving the approval decision, as previously discussed herein. The process may first comprise receiving an reviewing a request from a first entity to place an account on temporary waiver 201, and sending a message to a second entity for approval of the request 202, prior to processing one or more actions in response to receiving the approval decision As shown in FIG. 2, a first action processed in response to receiving an approval decision 203 stating the waiver request has been denied may comprise sending a confirmation message to the requesting entity informing them of the denied waiver request and that no additional action has been taken within the account 205. The process for requesting a waiver may then be subsequently terminated.

A first action processed in response to receiving an approval decision 203 stating the waiver request has been approved may comprise assigning the account a waiver. In some embodiments, assigning an account a waiver 204 for service payments may comprise deferring the scheduled assessment of payments associated with service usage and/or suspending the scheduled assessment of payments associated with service usage. For example, if a customer is approved for a three (3) month temporary waiver, the system may be configured to suspend the customers scheduled payment assessments for a period of three (3) months. However, in other embodiments, the waiver may be implemented by applying payment credits and/or refunds to the account that negate the amount of any previously assessed service payments. For example, if a customer is approved for a three (3) month temporary waiver, the system may be configured to apply a credit to the customer's account that is equivalent in amount to the cost of three (3) months of service payments.

A second action processed in response to receiving an approval decision 203 stating the waiver request has been approved may comprise sending a confirmation message to the requesting entity 206 informing them of the approved waiver request. In some embodiments, the system may be configured to automatically generate confirmation messages (e.g. email messages, multimedia message, text messages, social networking messages, internal messages within online banking or other business entity platforms, and the like) in response to assigning an account a temporary waiver that may be sent to the customer and comprise details of the approved waiver request. For example, if a customer is approved for a temporary waiver, the system may be configured to send the requesting entity a confirmation message that comprises the start date associated with the waiver and the end date associated with the waiver as well as the related account number, and waiver request number for reference.

A third action processed in response to receiving an approval decision 203 stating the waiver request has been approved may comprise manually and/or automatically updating one or more databases 207 associated with the waiver with information related to the approved waiver request. In some embodiments, the processing entity manually updates a temporary waiver database, waiver database, or general business database with the expiration date of the approved temporary waiver. For example, as shown in FIG. 3, if a customer associated with account number XXXXX is approved for a temporary waiver that is scheduled to expire on Month Day, Year, the system may be configured to update one or more database record(s) that corresponds to the current waiver request related to account number XXXXX with an expiration date of MM/DD/YYYY. In an alternative embodiment, the system may be configured to automatically update the temporary waiver database, waiver database, or general business database with the expiration date of the approved temporary waiver.

Figure 6:
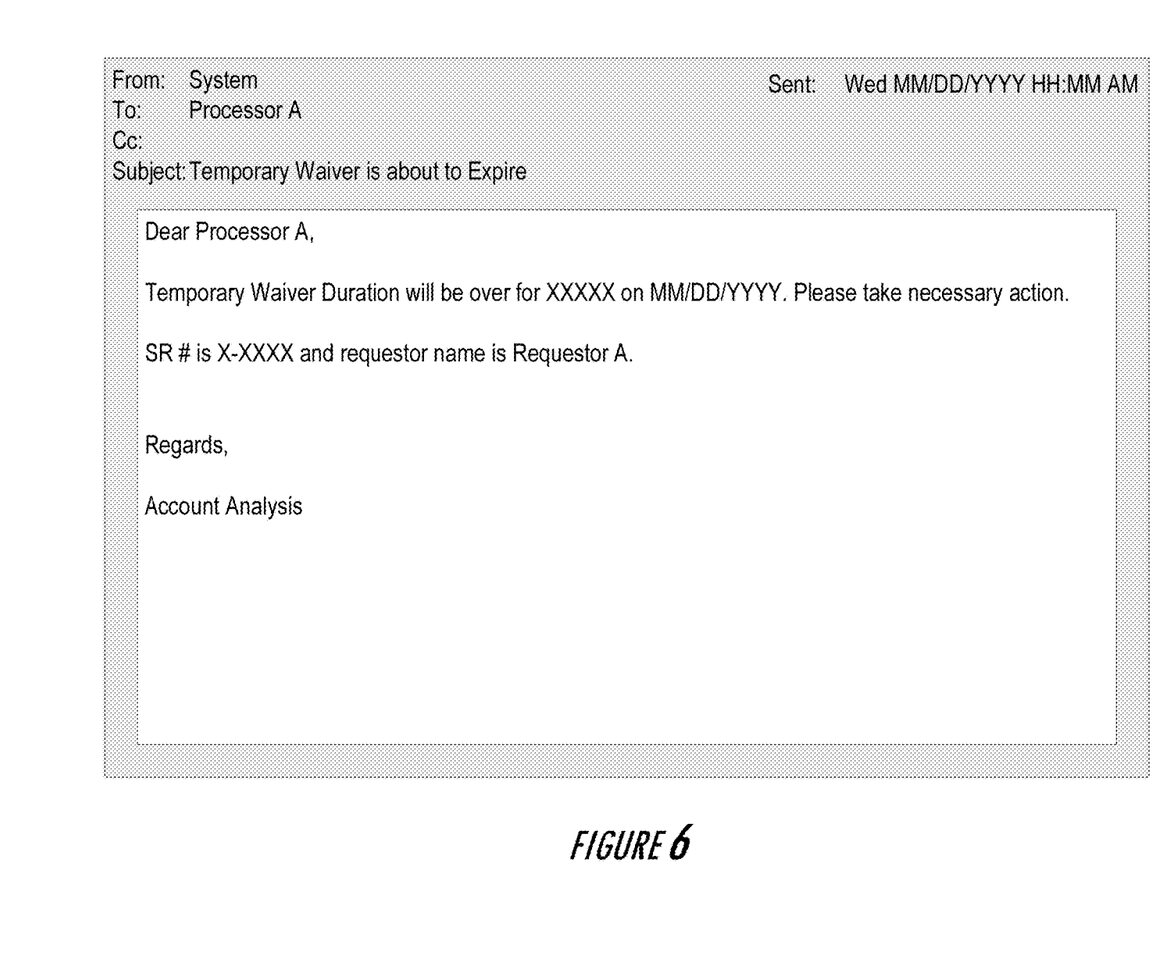
FIG. 6 is a screenshot illustrating a one-time reminder message, in accordance with embodiments of the present invention.

A fourth action processed in response to receiving an approval decision 203 stating the waiver request has been approved may comprise sending one or more automated messages 208 to the first entity (e.g. informing entity of expiration, requesting follow up, and the like). In some embodiments, as shown in FIG. 6, the system may be configured to automatically send a message (e.g. email messages, multimedia message, text messages, social networking messages, internal messages within online banking or other business entity platforms, and the like) informing one or more entities of the upcoming waiver expiration (e.g. processing entity, requesting entity, customer, and the like). For example, if a customer associated with account number XXXXX is approved for a temporary waiver that is scheduled to expire on Month Day, Year, the system may be configured to send the processing entity an email informing the processing entity that the temporary waiver is scheduled to expire and requesting the processing entity to similarly inform the requesting entity of the expiration. As such the one-time message may comprise information such as the account number, expiration date, request number, requesting entity name, and a request to take additional action. The one-time message may be sent a predetermined period of time prior to the expiration of the waiver based on the business policies.

Figure 7:
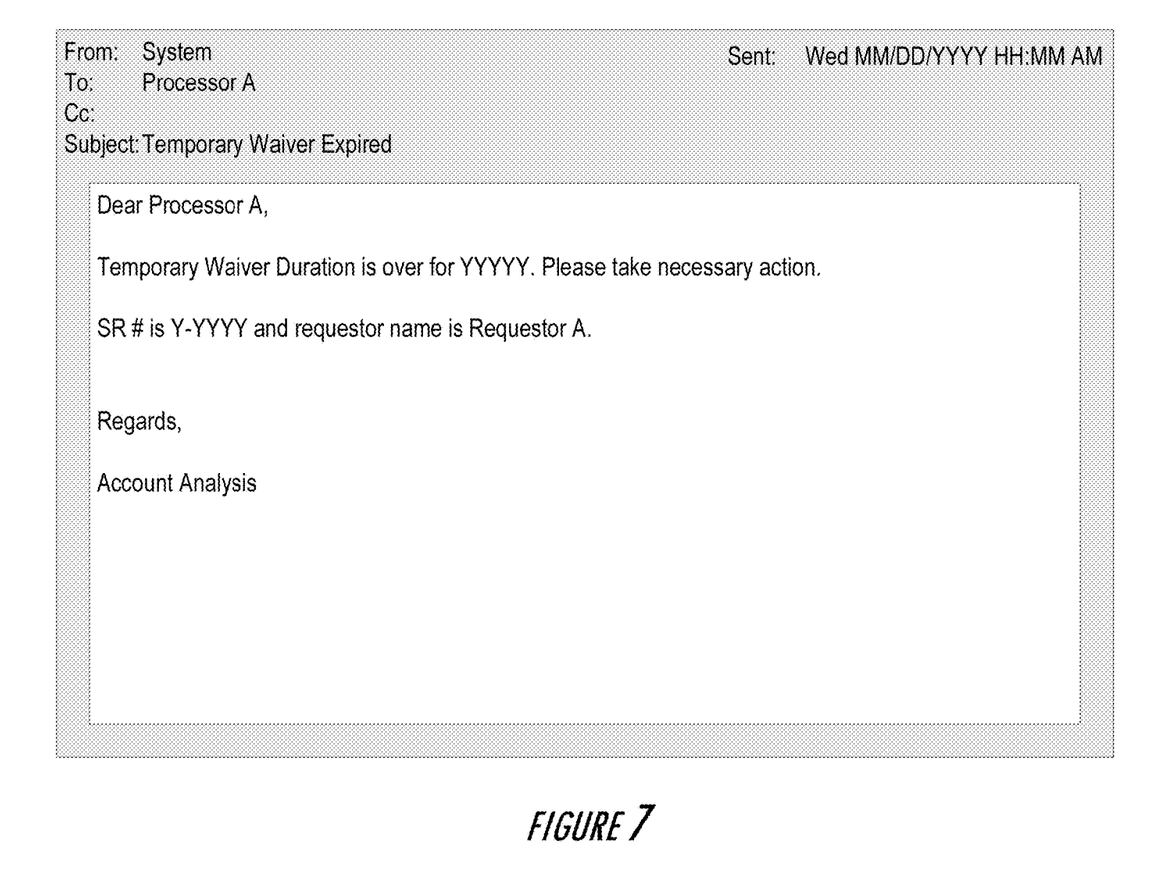
FIG. 7 is a screenshot illustrating a daily reminder message, in accordance with embodiments of the present invention.

In other embodiments, as shown in FIG. 7, the system may be configured to automatically send a daily message (e.g. email messages, multimedia message, text messages, social networking messages, internal messages within online banking or other business entity platforms, and the like) informing one or more entities that an expiration date has passed and the waiver duration is over (e.g. processing entity, requesting entity, customer, and the like). For example, if a customer associated with account number YYYYY is approved for a temporary waiver that is scheduled to expire on Month Day, Year, the system may be configured to send the processing entity an email on each day past Month Day, Year, informing the processing entity that the temporary waiver is over and requesting the processing entity to follow-up with the requesting entity of the expiration for the purpose of taking additional action. As such the daily message may comprise information such as the account number, expiration date, request number, requesting entity name, and a request to take additional action. The daily message may be sent a predetermined number of times after the expiration of the waiver passes based on the business policies.

In some embodiments, sending an automated message requires the system running a macro that initiates the automated transfer of a message. The system may then be configured to export information from one or more databases associated with waiver request that have been either manually updated by business personnel and/or automatically updated by the system for each waiver request. In some embodiments, the message is sent on each occasion that an associated import files is accessed until the related issue (e.g. an outstanding waiver expiration) has been address.

A fifth action processed in response to receiving an approval decision 203 stating the waiver request has been approved may comprise receiving a follow-up response 209 from the requesting entity to process one or more secondary actions, or that result in processing one or more secondary actions based at least partially on the response. Referring back to FIG. 2, this may comprise the system being configured to request a decision as to whether or not the account should be placed back into a payment status 209 after the expiration of the waiver has passed. For example, one or more secondary actions may be processed in response to receiving a follow-up response stating "No" the account should be placed back into payment status, including but not limited to, confirmation of a new expiration date 210, updating one or more associated waiver databases 211, reconfirming customer eligibility, and the like. Likewise, one or more secondary actions may be processed in response to receiving a follow-up response stating "Yes" the account should be placed back into payment status, including but not limited to, updating one or more associated waiver databases 213, taking no additional actions with the account, terminating the generation of automated messages 214, and the like. A secondary response of "Yes" may result in the related account being place back into a payment status, and a secondary response of "No" may result in the related account remaining in a waiver status for an additional period of time.

The fifth action may further comprise the system being configured to send a message to the requesting entity asking for a follow-up response which grants consent to place an account back into payment status. The system may then wait for a response from the requesting entity prior to taking any additional actions. In response to receiving a follow-up response 209 the system may then determine whether or not to place the account back into payment status based at least partially on the received follow-up response. In some embodiments, one the system and/or associated business personnel take action on the related account a notification is updated within the "Addressed?" column 307 to indicate the issue (e.g. an outstanding waiver expiration) has been addressed. For example, a selection and/or automatic update of "Yes" within the "addressed" column may result in additional actions such as restricting a Macro from sending automated expiration message from thereon to one or more entities associated with the related account number.

A secondary action processed in response to receiving a follow-up response stating "Yes" the account should be placed back into payment status 209 may comprise automatically updating one or more databases 213 associated with the waiver with information related to the approved waiver request. In some embodiments, the system may be configured to automatically update a temporary waiver database, waiver database, or general business database with a notification that indicates "yes" subsequent action has been taken on the account as previously requested. For example, if a requesting entity provides a secondary approval to place an account back into payment status, the system may then update the database to indicate "Yes" under an associated "Addressed?" column 307 for the related account record. Receiving the follow-up decision may further comprise taking action to place the account back into payment status which may comprise disassociating an account with a waiver for service payments by rescheduling the assessment of payments associated with service usage and/or reinstating the scheduled assessment of payments associated with service usage, removing payment credits and/or refunds to the account, and the like.

A secondary action processed in response to receiving a follow-up response stating "Yes" the account should be placed back into payment status may comprise terminating any automatically generated messages 214 being currently communicated to one or more entities such as daily messages informing the one or more entities that an expiration date has passed and the waiver duration is over and requesting an additional action to be taken. In response to manually selecting and/or automatically updating the database with a notification indicating the issue (e.g. an outstanding waiver) has been addressed, the system may be configured to simultaneously terminate the automated transmission of messages to the one or more entities in response to the updated notification within the corresponding database record. The process for requesting a waiver may then be subsequently terminated.

A secondary action processed in response to receiving a follow-up response stating "No" the account should not be placed back into payment status may comprise confirming a new expiration date 210 to be associated with the extension of the waiver request. In some embodiments, the system may be configured to automatically determine the new expiration date based at least partially on one or more business policies, and in other embodiments, the system may be configured to receive the new expiration date from the requesting entity along with the follow-up response, and/or a follow-up request to extend the waiver period for an additional duration of time after the initial expiration period has ended. For example, if a requesting entity provides a follow-up response stating "No" the account should not be placed back into payment status, the system may then receive and/determine and confirm a new expiration date to be associated with the extended waiver for the related account record.

A second secondary action processed in response to receiving a follow-up response stating "No" the account should not be placed back into payment status may comprise automatically updating one or more new database records 211 associated with the waiver with information related to the approved waiver request. In some embodiments, the system may be configured to automatically update a temporary waiver database, waiver database, or general business database with the new expiration date of the approved temporary waiver. This may additionally require creating a new record within the database for the extended waiver request. For example, if a customer associated with account number XXXXX is to receive an extension for a temporary waiver that is scheduled to expire on Month Day, Year, the system may be configured to update one or more new database record(s) that corresponds to the current waiver request related to account number XXXXX with an expiration date of MM/DD/YYYY.

A third secondary action processed in response to receiving a follow-up response stating "No" the account should not be placed back into payment status may comprise automatically updating one or more old database records 212 associated with the waiver with information related to the approved waiver request. In some embodiments, the system may be configured to automatically update a temporary waiver database, waiver database, or general business database with the new expiration date of the approved temporary waiver. For example, if a customer associated with account number XXXXX is to receive an extension for a temporary waiver that is scheduled to expire on Month Day, Year, the system may be configured to update the old database record to indicate "Yes" under an associated "Addressed?" column for the related account record, which may result in the subsequent termination of the automated transmission of messages to the one or more entities in response to the updated notification within the corresponding database record. The process for requesting a waiver may then be subsequently terminated.

Figure 8:
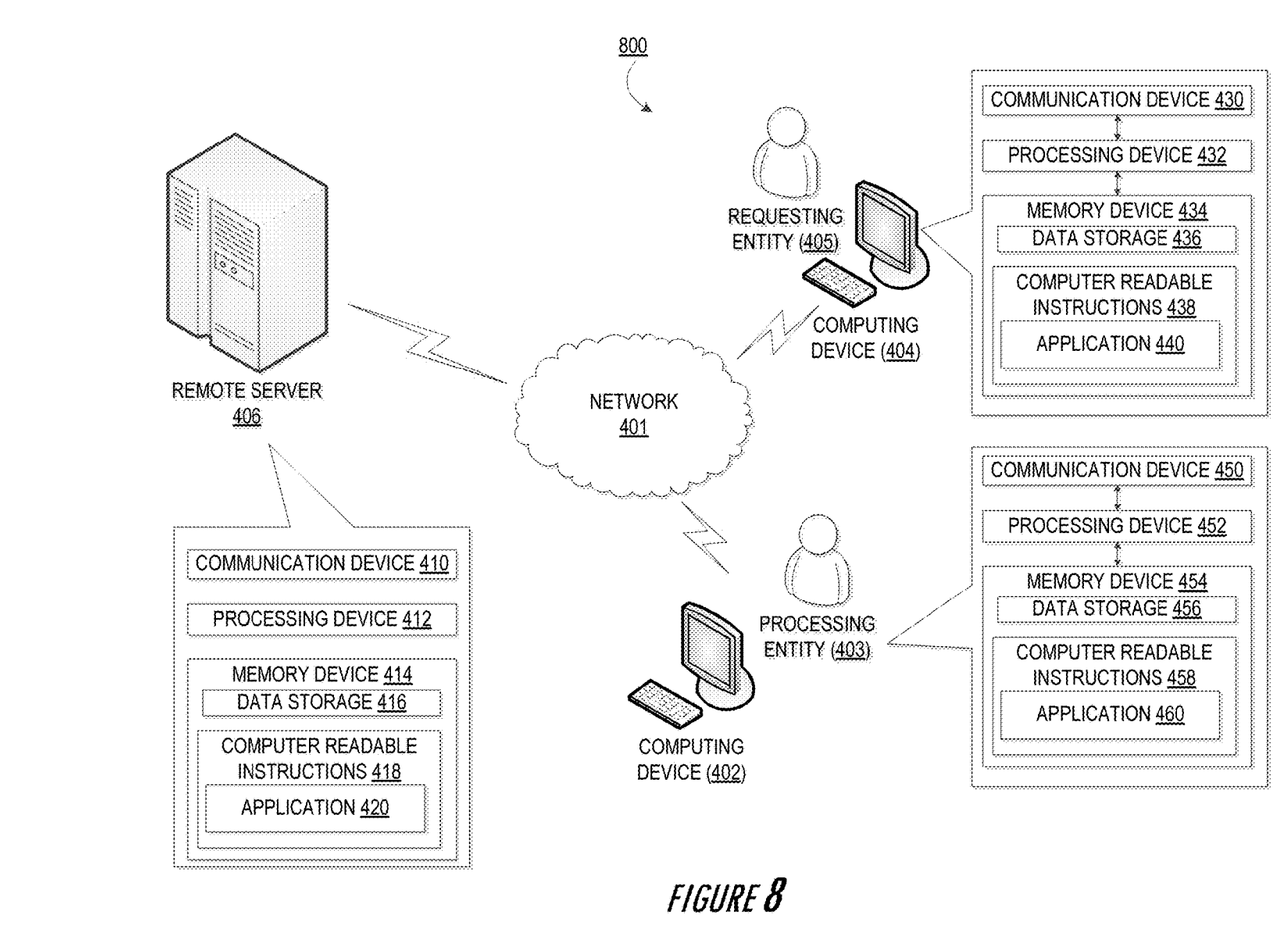
FIG. 8 is a diagram illustrating a networking environment system, in accordance with embodiments of the present invention.

Referring to FIG. 8, a network environment 800 is illustrated in accordance with embodiments of the present invention. As illustrated in FIG. 8, the processing entity computing device 402 is operatively coupled via a network 401 to the requesting entity computing device 404 and/or a remote server 406. In this configuration, the processing entity computing device 402 may send information to and receive information from the requesting entity computing device 404 and/or the remote server 406. Additionally, the requesting entity computing device 404 may send and receive communications directly from the remote server 406. The processing entity computing device 402 may be or include one or more network base stations or other network components. FIG. 8 illustrates only one example of an embodiment of a network environment 800, and it will be appreciated that in other embodiments one or more of the systems, devices, or servers may be combined into a single system, device, or server, or be made up of multiple systems, devices, or server.

The network 401 may be a global area network (GAN), such as the Internet, a wide area network (WAN), a local area network (LAN), a telecommunication network or any other type of network or combination of networks. The network 401 may provide for wire line, wireless, or a combination wire line and wireless communication between devices on the network 401.

In some embodiments, the requesting entity 405 is personnel within the business entity that are responsible for supplying request (e.g. waiver request) or acting on behalf of the customer in other function such as client managers. In some embodiments, the processing entity 403 is personnel within the business entity that are responsible for reviewing request (e.g. waiver request) or acting on behalf of the business entity in other function such as pricing managers and portfolio managers.

As illustrated in FIG. 8, the processing entity computing device 402 generally comprises a communication device 450, a processing device 452, and a memory device 454. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 452 is operatively coupled to the communication device 450 to communicate with the network 401 and other devices on the network 401. As such, the communication device 450 generally comprises a modem, server, or other device for communicating with other devices on the network 401.

As further illustrated in FIG. 8, the network processing entity computing device 402 comprises computer readable instructions 458 of an application 460. In some embodiments, the memory device, 454 includes data storage 456 for storing data related to and/or used by the application 460. The application 460 may perform one or more of the steps and/or sub-steps discussed herein and/or one or more steps not discussed herein. For example, in some embodiments, the application 460 may provide detailed information about one or more items of interest to the requesting entity computing device 404.

As illustrated in FIG. 8, the requesting entity computing device 404 generally comprises a communication device 430, a processing device 432, a memory device 434, and a data storage device 436. The processing device 432 is operatively coupled to the communication device 430 and the memory device 434. In some embodiments, the processing device 432 may send or receive data from the requesting entity computing device 404, to the processing entity computing device 402 via the communication device 430 over a network 401. As such, the communication device 430 generally comprises a modem, server, or other device for communicating with other devices on the network 401.

As further illustrated in FIG. 8, the requesting entity computing device 404 comprises computer readable instructions 438 stored in the memory device 434, which in one embodiment includes the computer-readable instructions 438 of an application 440. In the embodiment illustrated in FIG. 4, the application 440 allows the requesting entity computing device 404 to be linked to the processing entity computing device 402 to communicate, via a network 401. The application 440 may also allow the requesting entity computing device 404 to connect directly (i.e. locally or device to device) with the remote server 406 for sending and receiving information. The application 440 may perform one or more of the steps and/or sub-steps discussed herein and/or one or more steps not discussed herein. For example, in some embodiments, the application 440 may send information for a waiver request.

As illustrated in FIG. 8, the remote server 406 may include a communication device 410, a processing device 412, a memory device 414, and a data storage device 416.

The processing device 412 is operatively coupled to the communication device 410 and the memory device 414. In some embodiments, the processing device 412 may send or receive data from the requesting entity computing device 404 and/or the processing entity computing device 402 via the communication device 410. Such communication may be performed either over a direct connection and/or over a network 401. As such, the communication device 410 generally comprises a modem, server, or other device for communication with other devices on the network 401.

As further illustrated in FIG. 8, the remote server 406 comprises computer-readable instructions 418 of an application 420. In the embodiment illustrated in FIG. 4, the application 420 allows the database 406 to be linked to the processing entity computing device 402 to communicate, via a network 401. The application 420 may also allow the requesting entity computing device 404 to connect directly (i.e., locally or device to device) with the remote server 406 or indirectly through the network 401. The application 420 may perform one or more of the steps and/or sub-steps discussed herein and/or one or more steps not discussed herein.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for automating data communication for purposes of providing temporary waivers in a financial institution, the apparatus comprising:
    a memory;
    one or more computing processors; and
    a module stored in the memory, said module comprising instruction code executable by the one or more computing processors, and configured to:
    cause the one or more computing processors to receive a request from a requesting entity to assign an account a temporary waiver, wherein the account is associated with one or more services that require a payment for utilizing the service, and wherein the temporary waiver temporarily cancels service payments associated with utilizing the one or more services;
    cause the one or more computing processors to generate a data record associated with the request;
    cause the one or more computing processors to automatically update a record log within a waiver request database using the data record associated with the request;
    cause the one or more computing processors to review the request to verify that a first item of required information has been provided;
    cause the one or more computing processors to temporarily reject the request in response to determining that the first item of required information has not been provided;
    cause the one or more computing processors to prompt the requesting entity to provide the first item of required information prior to resubmitting the request to assign the account the temporary waiver;
    cause the one or more computing processors to analyze the request according to at least one predetermined approval criterion;
    cause the one or more computing processors to generate an approval decision based at least partially on analyzing the request according to the at least one predetermined approval criterion;
    cause the one or more computing processors to process an action based on the approval decision that indicates whether or not the request was approved or denied;
    cause the one or more computing processors to determine that the approval decision indicates that the request was approved;
    cause the one or more computing processors to assign the temporary waiver to the account, the temporary waiver having a fixed duration;
    cause the one or more computing processors to automatically update a waiver database by generating a data record associated with the temporary waiver;
    cause the one or more computing processors to determine that the duration of the temporary waiver has elapsed;
    cause the one or more computing processors to run a macro, wherein the macro is configured to, in response to determining that the temporary waiver has elapsed, to send an automated expiration message to at least one entity associated with the request;
    cause the one or more computing processors to receive a follow-up response to the automated expiration message;
    cause the one or more computing processors to, in response to receiving the follow-up response, restrict the macro from sending future expiration messages;
    cause the one or more computing processors to automatically update a status of the account to reflect removal of the temporary waiver; and
    cause the one or more computing processors to automatically update the waiver database by generating a data record associated with the removal of the temporary waiver.

2. The apparatus of claim 1, wherein the request comprises a second item of required information, and wherein the module is further configured to cause the one or more computing processors to:
    review the request to verify that the second item of required information is valid;
    temporarily reject the request in response to determining the second item of required information is not valid; and
    prompt the requesting entity to provide valid information for the second item of required information prior to resubmitting the request to assign the account a temporary waiver.

3. The apparatus of claim 1, wherein the account is associated with a customer, and wherein analyzing the request for approval further comprises the module being further configured to cause the one or more computing processors to:
    access the customer's financial history; and
    determine the customer is eligible to receive the temporary waiver based at least partially on an analysis of the customer's financial history.

4. The apparatus of claim 1, wherein the module is further configured to cause the one or more computer processors to:
    temporarily revoke the temporary waiver from the account;
    determine one or more terms and conditions for usage of the temporary waiver;
    send the one or more terms and conditions to a customer associated with the account;

receive, from the customer, consent to agree to the one or more terms and conditions; and reassign the temporary waiver to the account in response to receiving the consent to agree to the one or more terms and conditions.

5. The apparatus of claim 1, wherein the module is further configured to cause the one or more computer processors to:
send a confirmation message to the requesting entity to inform the requesting entity that the request was approved.

6. The apparatus of claim 1, wherein the module is further configured to cause the one or more computer processors to send one or more automated messages to at least one entity associated with the request.

7. The apparatus of claim 6, wherein a first automated message comprises a one-time message informing one or more entities of an upcoming expiration date for the temporary waiver.

8. The apparatus of claim 6, wherein a second automated message comprises a daily message informing one or more entities that an expiration date associated with the temporary waiver has passed and the temporary waiver duration is over.

9. A computerized method for use in financial systems, whereby the method provides steps for automating data communication for purposes of providing temporary waivers, the method comprising:
receiving, via one or more computer processors, a request from a requesting entity to assign an account a temporary waiver, wherein the account is associated with one or more services that require a payment for utilizing the service, and wherein the temporary waiver temporarily cancels service payments associated with utilizing the one or more services;
generating, via the one or more computer processors, a data record associated with the request;
automatically updating, via the one or more computer processors, a record log within a waiver request database using the data record associated with the request;
reviewing, via the one or more computer processors, the request to verify that a first item of required information have been provided;
temporarily rejecting, via the one or more computer processors, the request in response to determining that the first item of required information has not been provided;
prompting, via the one or more computer processors, the requesting entity to provide the first item of required information prior to resubmitting the request to assign the account a temporary waiver;
analyzing, via the one or more computer processors, the request according to at least one predetermined approval criterion;
generating, via the one or more computer processors, an approval decision based at least partially on analyzing the request according to the at least one predetermined approval criterion;
processing, via the one or more computer processors, an action based on the approval decision that indicates whether or not the request was approved or denied;
determining, via the one or more computer processors, that the approval decision indicates that the request was approved;
assigning, via the one or more computer processors, the temporary waiver to the account, the temporary waiver having a fixed duration;

automatically updating, via the one or more computer processors, a waiver database by generating a data record associated with the temporary waiver;
determining, via the one or more computer processors, that the duration of the temporary waiver has elapsed;
running, via the one or more computer processors, a macro, wherein the macro is configured to, in response to determining that the temporary waiver has elapsed, to send an automated expiration message to at least one entity associated with the request;
receiving, via the one or more computer processors, a follow-up response to the automated expiration message;
in response to receiving the follow-up response, restricting, via the one or more computer processors, the macro from sending future expiration messages;
automatically updating, via the one or more computer processors, a status of the account to reflect removal of the temporary waiver; and
automatically updating, via the one or more computer processors, the waiver database by generating a data record associated with the removal of the temporary waiver.

10. The method of claim 9, wherein the method further comprises sending one or more automated messages to at least one entity associated with the request.

11. The method of claim 10, wherein a first automated message comprises a one-time message informing one or more entities of an upcoming expiration date for the temporary waiver.

12. The method of claim 10, wherein a second automated message comprises a daily message informing one or more entities that an expiration date associated with the temporary waiver has passed and the temporary waiver duration is over.

13. The method of claim 9, the method further comprising:
temporarily revoking the temporary waiver from the account;
determining one or more terms and conditions for usage of the temporary waiver;
sending the one or more terms and conditions to a customer associated with the account;
receiving, from the customer, consent to agree to the one or more terms and conditions; and
reassigning the temporary waiver to the account in response to receiving the consent to agree to the one or more terms and conditions.

14. The method of claim 9, the method further comprising sending a confirmation message to the requesting entity to inform the requesting entity that the request was approved.

15. A computer program product for use in financial systems, whereby the computer program product automates data communication for purposes of providing temporary waivers, the computer program product comprising:
a non-transitory computer-readable medium comprising a set of codes for:
causing one or more computing processors to receive a request from a requesting entity to assign an account a temporary waiver, wherein the account is associated with one or more services that require a payment for utilizing the service, and wherein the temporary waiver temporarily cancels service payments associated with utilizing the one or more services;
causing the one or more computing processors to generate a data record associated with the request;

causing the one or more computing processors to automatically update a record log within a waiver request database using the data record associated with the request;

causing the one or more computing processors to review the request to verify that a first item of required information has been provided;

causing the one or more computing processors to temporarily reject the request in response to determining that the first item of required information has not been provided;

causing the one or more computing processors to prompt the requesting entity to provide the first item of required information prior to resubmitting the request to assign the account the temporary waiver;

causing the one or more computing processors to analyze the request according to at least one predetermined approval criterion;

causing the one or more computing processors to generate an approval decision based at least partially on analyzing the request according to the at least one predetermined approval criterion;

causing the one or more computing processors to process an action based on the approval decision that indicates whether or not the request was approved or denied;

causing the one or more computing processors to determine that the approval decision indicates that the request was approved;

causing the one or more computing processors to assign the temporary waiver to the account, the temporary waiver having a fixed duration;

causing the one or more computing processors to automatically update a waiver database by generating a data record associated with the temporary waiver;

causing the one or more computing processors to determine that the duration of the temporary waiver has elapsed;

causing the one or more computing processors to run a macro, wherein the macro is configured to, in response to determining that the temporary waiver has elapsed, to send an automated expiration message to at least one entity associated with the request;

causing the one or more computing processors to receive a follow-up response to the automated expiration message;

causing the one or more computing processors to, in response to receiving the follow-up response, restrict the macro from sending future expiration messages;

causing the one or more computing processors to automatically update a status of the account to reflect removal of the temporary waiver; and causing the one or more computing processors to automatically update the waiver database by generating a data record associated with the removal of the temporary waiver.

16. The computer program product of claim 15, wherein the computer program product further comprises a set of codes for causing the one or more computer processors to send one or more automated messages to at least one entity associated with the request.

17. The computer program product of claim 16, wherein a first automated message comprises a one-time message informing one or more entities of an upcoming expiration date for the temporary waiver.

18. The computer program product of claim 16, wherein a second automated message comprises a daily message informing one or more entities that an expiration date associated with the temporary waiver has passed and the temporary waiver duration is over.

19. The computer program product of claim 15, wherein the computer program product further comprises a set of codes for causing the one or more computer processors to:
temporarily revoke the temporary waiver from the account;
determine one or more terms and conditions for usage of the temporary waiver;
send the one or more terms and conditions to a customer associated with the account;
receive, from the customer, consent to agree to the one or more terms and conditions; and
reassign the temporary waiver to the account in response to receiving the consent to agree to the one or more terms and conditions.

20. The computer program product of claim 15, wherein the computer program product further comprises a set of codes for causing the one or more computer processors to send a confirmation message to the requesting entity to inform the requesting entity that the request was approved.

* * * * *